(12) United States Patent
Miles et al.

(10) Patent No.: US 10,758,918 B2
(45) Date of Patent: *Sep. 1, 2020

(54) METHOD AND APPARATUS FOR CLEANING A MACHINE EMPLOYING PERMANENT MAGNETS TO REMOVE FERROUS METALS FROM A FLOW OF MATERIAL

(71) Applicant: DRP Ventures Inc., Kelowna (CA)

(72) Inventors: David Roger Miles, Kelowna (CA); Peter Thomas Watson, Kelowna (CA)

(73) Assignee: DRP Ventures Inc., Kelowna, British Columbia (CA)

( * ) Notice: Subject to any disclaimer, the term of this patent is extended or adjusted under 35 U.S.C. 154(b) by 44 days.

This patent is subject to a terminal disclaimer.

(21) Appl. No.: 16/142,822

(22) Filed: Sep. 26, 2018

(65) Prior Publication Data

US 2019/0022666 A1    Jan. 24, 2019

Related U.S. Application Data

(63) Continuation-in-part of application No. 15/497,056, filed on Apr. 25, 2017, now Pat. No. 10,112,201.

(Continued)

(51) Int. Cl.
*B03C 1/16* (2006.01)
*B03C 1/22* (2006.01)
(Continued)

(52) U.S. Cl.
CPC ............... *B03C 1/22* (2013.01); *B03C 1/035* (2013.01); *B03C 1/0332* (2013.01); *B03C 1/26* (2013.01);
(Continued)

(58) Field of Classification Search
CPC .... B03C 1/16; B03C 1/18; B03C 1/22; B03C 2201/20; B03C 2201/28; H02J 7/32; H02J 7/35; H02J 7/355; H02S 40/38
See application file for complete search history.

(56) References Cited

U.S. PATENT DOCUMENTS 2,176,784 A * 10/1939 Bowden .................... B03C 1/22
209/215
2,591,122 A *  4/1952 Blind ........................ B03C 1/20
209/223.1

(Continued)

FOREIGN PATENT DOCUMENTS

CN       205128479       4/2016
WO       2000058186      10/2000

*Primary Examiner* — Joseph C Rodriguez
(74) *Attorney, Agent, or Firm* — Atony C. Edwards

(57) ABSTRACT

A magnet cleaner cooperates with one or more permanent magnets positioned over a conveyer carrying pieces of metal in non-ferrous material so as to remove the metal from the non-ferrous material. The magnet cleaner includes a frame and a capture sheet mounted to the frame and positioned on the frame so as to be substantially flush with the permanent magnets when they are in their lowered positioned. The magnets are spaced by an attenuation distance from the capture sheet when they are in their raised position. The permanent magnets, which may be mounted in a housing, are positionably mounted on the frame so as to be selectively elevatable between their lowered and raised positions upon actuation of an actuator. The actuator is positioned so as to cooperate with the permanent magnets and the frame so as to raise or lower the magnets relative to the capture sheet.

17 Claims, 5 Drawing Sheets

Related U.S. Application Data

(60) Provisional application No. 62/327,804, filed on Apr. 26, 2016.

(51) Int. Cl.
  *B03C 1/26* (2006.01)
  *B03C 1/033* (2006.01)
  *H02S 40/38* (2014.01)
  *B03C 1/035* (2006.01)
  *H02J 7/35* (2006.01)

(52) U.S. Cl.
  CPC .......... *H02S 40/38* (2014.12); *B03C 2201/20* (2013.01); *B03C 2201/28* (2013.01); *H02J 7/35* (2013.01)

(56) References Cited

U.S. PATENT DOCUMENTS

| | | | | |
|---|---|---|---|---|
| 2,702,123 A | * | 2/1955 | Injeski, Jr. | B03C 1/22 209/223.1 |
| 2,724,504 A | * | 11/1955 | Blind | B03C 1/20 209/223.1 |
| 2,747,735 A | * | 5/1956 | Palm | B03C 1/22 209/223.1 |
| 3,935,947 A | * | 2/1976 | Barrett | B03C 1/22 209/636 |
| 4,273,646 A | * | 6/1981 | Spodig | B03C 1/22 209/223.1 |
| 4,738,367 A | * | 4/1988 | Barrett | B03C 1/22 209/223.1 |
| 5,823,354 A | * | 10/1998 | Elkind | B03C 1/0335 209/212 |
| 6,717,280 B1 | * | 4/2004 | Bienville | A63B 21/0053 290/1 D |
| 7,438,187 B2 | * | 10/2008 | Laveine | B03B 9/061 209/223.1 |
| 8,007,408 B1 | * | 8/2011 | Moran | A63B 22/0023 482/2 |
| 8,807,344 B2 | * | 8/2014 | Keaton | B03C 1/0332 209/214 |
| 9,539,584 B2 | * | 1/2017 | Oki | B03C 1/22 |
| 9,843,239 B2 | * | 12/2017 | Wang | H02K 7/1861 |
| 9,876,464 B2 | * | 1/2018 | Mamdouh | F03D 9/007 |

* cited by examiner

METHOD AND APPARATUS FOR CLEANING A MACHINE EMPLOYING PERMANENT MAGNETS TO REMOVE FERROUS METALS FROM A FLOW OF MATERIAL

CROSS-REFERENCE TO RELATED APPLICATIONS

This application in a continuation-in-part of U.S. patent application Ser. No. 15/497,056 filed Apr. 25, 2017 which in turn claims priority from U.S. Provisional Patent Application No. 62/327,804 filed Apr. 26, 2016, both entitled Method and Apparatus for Cleaning a Machine Employing Permanent Magnets to Remove Ferrous Metals from a Flow of Material, entireties of which are incorporated herein by reference.

BACKGROUND

It is known in the prior art to employ permanent magnets to remove ferrous metal from a flow of material such as granular material, broken material including rubble, and waste material including for example, organic material for use in bio-mass energy reclamation. Typically, a flow of material is conveyed on an endless conveyer and the permanent magnets are positioned relative to the conveyer, and relative to the flow of material thereon, so as to attract, and retain against the permanent magnets or their housing, any ferrous materials passing in proximity to the magnets. However, it often proves difficult and time consuming to clean the ferrous materials adhered to the permanent magnets due to the strong attractive force of the magnets as the cleaning of the ferrous materials from the magnet is typically done by a worker. Consequently it is also known in the prior art to use electro-magnets instead of permanent magnets, so that electro-magnets maybe de-energized when it is desired to remove the adhered collection of ferrous metals. However, use of electro-magnets is relatively expensive, and requires a powered source of energy for the electromagnet.

Consequently, there exists a need for a device which enables the cleaning of ferrous metals on the face of permanent magnet housing, and in particular, such a cleaning device which requires little or no additional external power source for operation.

In the prior art, Applicant is aware of PCT international patent application no. PCT/US99/23383 which published on Oct. 5, 2000, under publication number WO 00/58186 entitled: non-continuous system for automatic self-cleaning of permanent magnets or electro magnets. That patent application discloses a non-continuous, self-cleaning or automatic cleaning system for magnets consisting of a non-magnetic sweeper, where the sweeper is kept in place and allows free movement by means of guide bearings on the respective sides of a plate. The movement of the sweeper is taught to be achieved by mechanical or impact, pneumatic or hydraulic systems and electric motors. The sweeper has a flat face which moves forwardly and strikes iron particles adhering to the magnetic surface so as to expel the particles in the same direction as the forward motion of the sweeper.

SUMMARY

The magnet cleaner, according to the present specification, cooperates with a permanent magnet or plurality of permanent magnets positioned over a conveyer carrying pieces of metal in non-ferrous material so as to remove the metal from the non-ferrous material. The magnet cleaner in one embodiment includes a frame and a capture sheet mounted to the frame and positioned on the frame so as to be substantially flush with the permanent magnet(s) when they are in their lowered position. The magnets are spaced by an attenuation distance from the capture sheet when they are in their raised position. The permanent magnets, which advantageously may be mounted in a housing, are positionably mounted on the frame so as to be selectively elevatable between their lowered position and their raised position upon actuation of an actuator. The actuator cooperates with the permanent magnets and the frame so as to raise or lower the magnets relative to the capture sheet. In one embodiment a parasitic energy scavenger harvests energy from the moving conveyer and provides energy for the actuator. In a further embodiment a passive energy source such as a solar panel may be employed independently or to assist the supply of energy from the energy scavenger.

The parasitic energy scavenger is mounted so as to engage the conveyer, wherein translation of the conveyer imparts energy from the conveyer to the energy scavenger. An energy converter cooperates with the energy scavenger. The energy converter may include, and may charge, a battery or bank of batteries. The energy converter may be solely a solar panel independently charging the battery. The energy converter cooperates with the actuator so as to selectively drive the actuator to thereby position the permanent magnets between their lowered and raised positions. When the permanent magnets are in their raised position the attenuation distance to the capture sheet is sufficient to allow release of the pieces of metal which have been magnetically collected to the underside of the capture sheet when the permanent magnets were in their lowered position. The permanent magnets may be mounted in a housing which is pivotally mounted to the frame.

In one embodiment, not intended to be limiting, the energy scavenger includes a rotatable member adapted to rotatably engage with the conveyer so as to convert translational energy of the conveyer to rotational energy of the rotatable member.

Advantageously, the rotatable member contacts the underside of the conveyer. In the illustrated embodiments, which serves as an example, the rotatable member includes a roller or other kind of idler mounted under the underside of the conveyer. The rotatable member engages the underside of the conveyer so as to cause an upwardly extending bump in the conveyer at a static position under the capture sheet. Because the conveyer translates in a longitudinal direction along its length, the roller may be described as extending transversely relative to the longitudinal direction of the conveyer. For example, advantageously, the roller extends entirely across a transverse width of the conveyer.

In one embodiment, the actuator includes a winch and a corresponding winch line. Advantageously, the winch is mounted on the frame and the winch line is positioned to haul the magnets, for example when mounted in their housing, upwardly upon actuation of the winch. In one embodiment, wherein the winch is an electric winch, the energy converter includes a battery which is charged using the energy from the energy scavenger. The energy converter may include a gear set driving an alternator. The alternator charges a battery, and the actuator is electrically driven by the battery.

DETAILED DESCRIPTION

Figure 1:
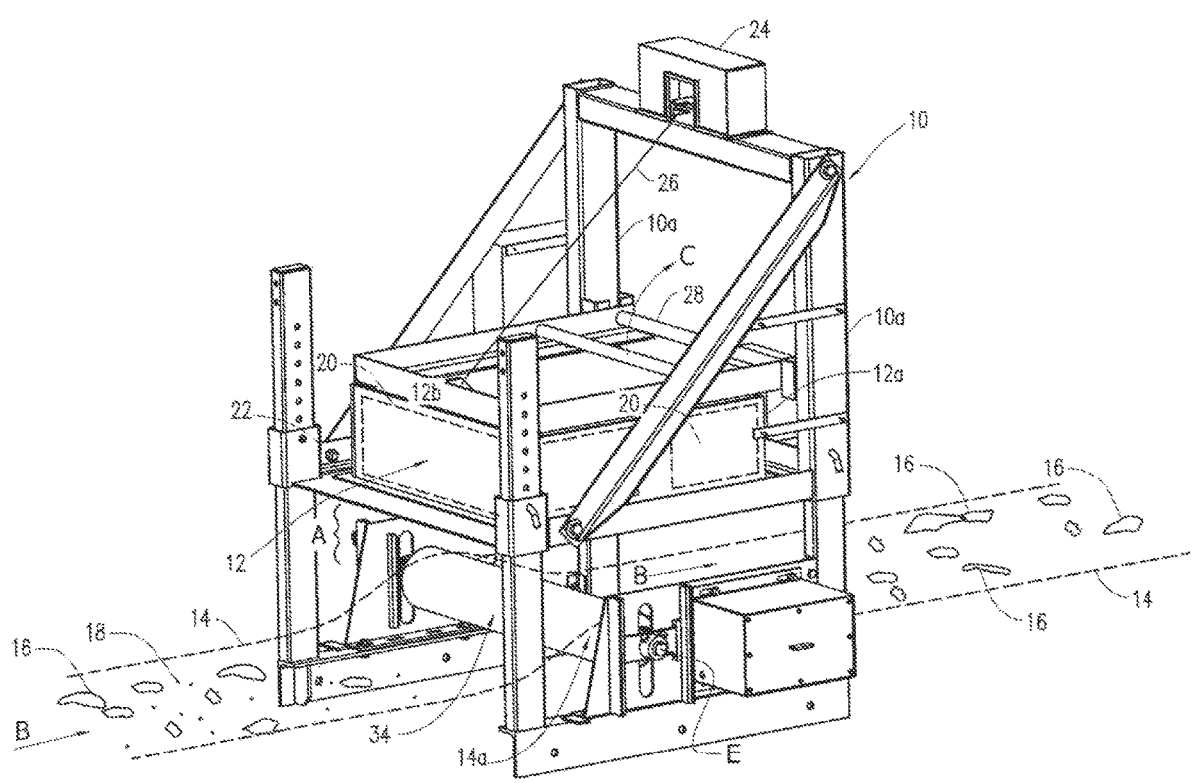
FIG. 1 is a left side perspective view of a permanent magnet cleaning machine according to one embodiment of a present invention.

As seen in the accompanying figures, in which like reference numerals refer to corresponding parts in each view, a support stand or a frame 10 supports a permanent magnet housing 12 in an optimized stand-off distance A over a conveyer belt 14 (shown in dotted outline). Conveyer belt 14 conveys in direction B a flow of non-ferrous material 16 containing pieces of ferrous metal 18. The permanent magnet housing contains permanent magnets 20, shown in dotted outline within housing 12, arranged in an array therein. The magnets are mounted within the housing.

Figure 2:
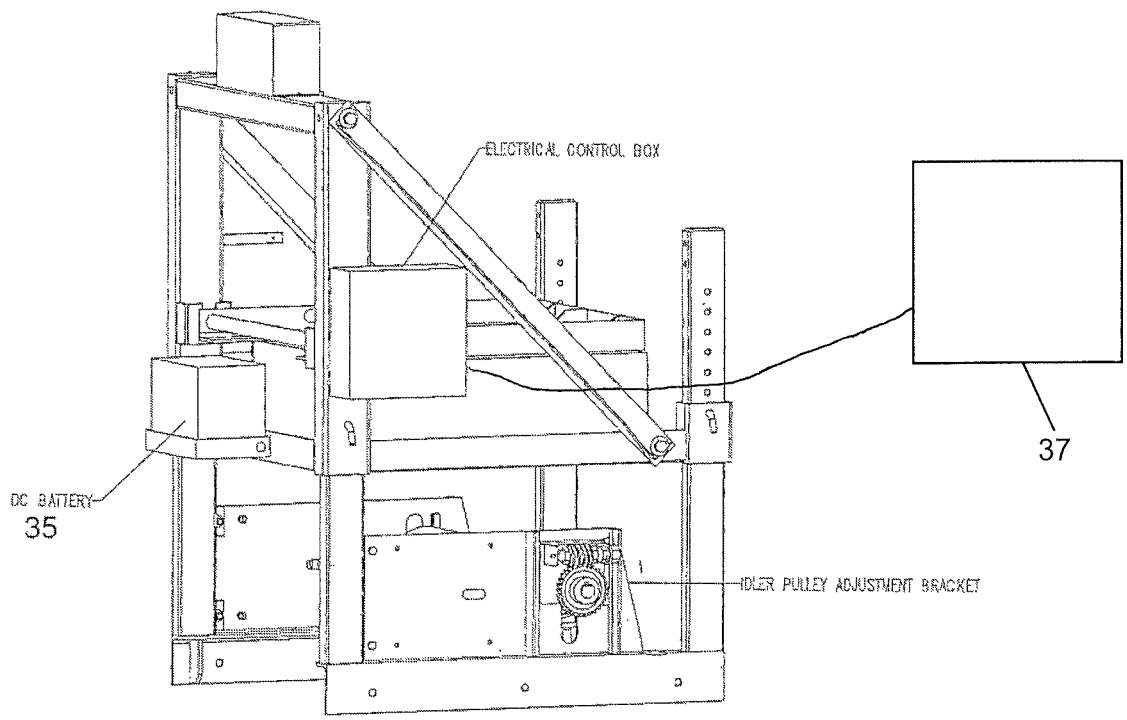
FIG. 2 is a right side perspective view of a permanent magnet cleaning machine of FIG. 1.

The permanent magnet housing 12 when in its horizontal position as seen in FIGS. 1 and 2, rests down upon, or closely adjacent to, so as to be substantially flush with a metal capture sheet 22 which is positioned above so as to be substantially parallel to, the conveyer belt. For example the capture sheet may be horizontal. An electrically driven actuator, such as for example direct current electric lifting winch 24 is mounted on the frame 10 so as to be rigidly supported above a first end, for example, the downstream end relative to the direction of flow B, of the permanent magnet housing 12a. The electric actuator drives a lifting mechanism, which is, for example, in the case of a lifting winch, a winch line such as cable 26. Other drive mechanisms may also work such as for example a set of gears or pulleys, etc., cooperating between an electric actuator and the permanent magnet housing 12. A selectively inflatable airbag cooperating with the magnet housing 12a, and driven, for example, by an electrically operated compressor, may also work to raise and lower magnet housing 12.

Figure 3:
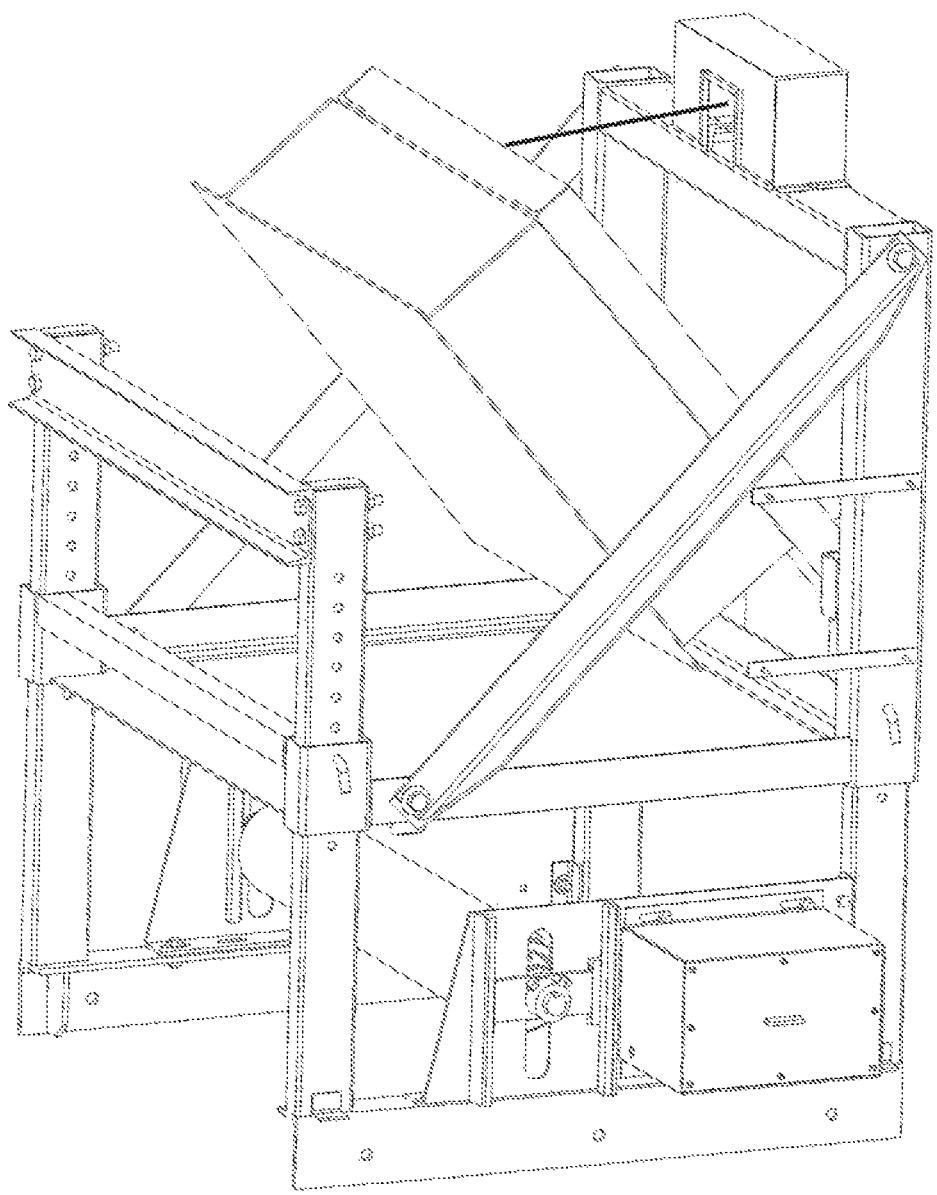
FIG. 3 is, in left side perspective view, the permanent magnet cleaning machine of FIG. 1 with the permanent magnet housing pivoted into its lifted position.

The first end of the permanent magnet housing 12 is pivotably mounted to the frame 10, for example, pivotally mounted on the pivot shaft 28, pivot shaft 28 on the vertical supports 10a, supporting the winch 24. Winch 24, when actuated, tensions cable 26 and pivots the permanent magnet housing 12 about shaft 28 so as to raise the second end 12b of the permanent magnet housing 12. The winch cable 26 extends from the lifting winch 24 to the second end 12b of the permanent magnet housing 12. Upon actuation of the lifting winch, winch cable 30 is wound up on to the take-up spool (not shown) of the lifting winch so as to thereby raise the second end of the permanent magnet housing in direction C into its pivoted and lifted position as seen in FIG. 3.

An idler, such as adjustable idler roller 34 or other energy scavenging mechanism which parasitically captures energy from the translation of the conveyer belt, maybe mounted so as to contact the conveyer belt. For example, roller 34 may be mounted underneath the conveyer belt 14 so as to engage upwardly against the underside of the conveyer belt. In one embodiment, not intended to be limiting, the idler roller is adjustable vertically so that the height of the idler roller relative to the conveyer belt maybe selectably adjusted. This allows the height of the roller to be optimised for optimized removal of metal 18 from material 16 on the conveyer. The idler roller 34 is otherwise statically positioned and engages the underside of the conveyer belt as the conveyer belt moves in direction B, thereby rotating idler roller 34 in direction D at a rate corresponding with the translation speed of the conveyer belt. The engagement between roller 34 and conveyer belt 14 may be only frictional engagement. As the conveyer belt is flexible, and because the roller is positioned, raised, so as to be engaged against the underside of the conveyer belt, the conveyer belt bends as it passes over the idler roller 34. The bend in the belt forms an upwardly extending bump 14a in the conveyer belt 14. Bump 14a extends laterally across the conveyer belt as the conveyer belt passes over the idler roller, for example linearly entirely across the width of the belt. The presence of the bump is advantageous, as described below.

A rechargeable battery such as a high capacity, direct current, twelve volt battery 35 is mounted so as to cooperate electrically with both the electrically driven actuator, such as the electric lifting winch 24, and with an energy converter such as a charging system having a battery charging circuit contained within a battery charging box 36.

Figure 4:
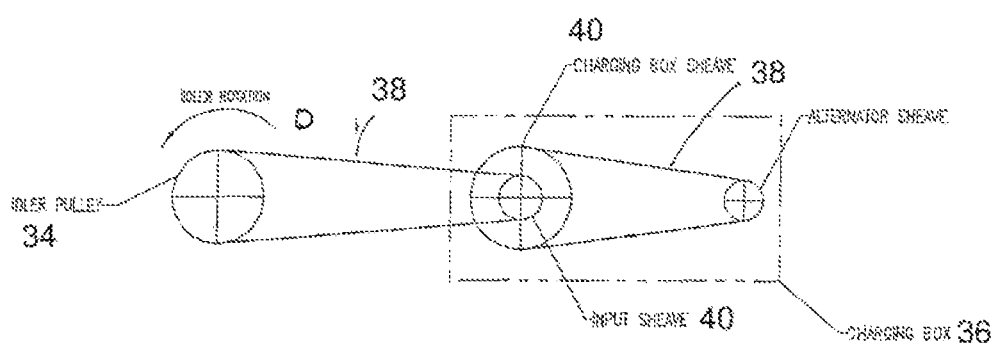
FIG. 4 is a diagrammatic view of a mechanical driving arrangement between the idler or pulley and alternator of the battery charging system.

As seen in the diagrammatic view of the charging system in FIG. 4, rotation of the idler roller in direction D about axis of rotation E, which rotates due to its engagement with the moving conveyer belt 14, drives an alternator (not shown), for example by the use of belts 38 and sheaves 40. The ratio of diameters between the charging box sheave, the input sheave, and the alternator sheave (referred to herein as a gear set) are adjusted so that the idler rotation speed, driven by the speed of the conveyer belt passing over the idler roller, drives the alternator at its required rotation speed. The determination of the ratios between the sheave's diameters will be known to one skilled in the art so as to convert the mechanical energy provided by the conveyer belt rotating the idler roller into electrical energy provided by the alternator. The alternator charges the direct current battery. Electrical control box 42 contains switch mechanism (not shown), the operations of which allows a user to operate the electric actuator such as the lifting winch using the power provided by the battery 35.

In a further embodiment, a solar panel 37 is electrically connected so as to charge the battery; either independently or so as to assist the alternator in charging the battery.

Thus as the material 16 to be cleaned is conveyed on the conveyer belt 14 underneath the lowered permanent magnet housing 12, when it is resting on or flush with the capture sheet 22, and with the stand-off distance A adjusted to optimize the magnetic attraction from the permanent magnets in magnet housing 12 acting on the pieces of ferrous metal 18 within the non-ferrous materials 16 conveyed on the conveyer belt 14, as the material 16 passes over the laterally extending bump 14a the material 16 is momentarily lifted up (given a vertical impulse and momentum) and slightly separated so as to assist in also providing vertical momentum to the pieces of ferrous metal. The vertical momentum and separation of the material 16, assists in the magnetic attraction of the pieces of ferrous metal 18 towards the permanent magnets 20. If materials are not lifted, the vertical separation of materials 16 from the magnets 20 may act to attenuate the magnetic field from the permanent magnets 20. The pieces of ferrous metal 18 are thereby pulled magnetically upwardly out of the flow of material 16 so as to adhere to the underside of the capture sheet 22, underneath the permanent magnet housing 12. Advantageously, capture sheet 22 is made of metal.

When it is desired to clean the pieces of ferrous metal 18 from the underside of the capture sheet 22, the user actuates the actuator, such as winch 24, so as to raise the permanent magnet housing 12 into its raised position. This then distances the permanent magnets 20 within the housing 12 from the bottom of the capture sheet 22 to a sufficient extent so that the pieces of ferrous metal 18 may be more easily removed by the user due to the reduction in the magnetic force adhering the pieces of ferrous metal to the capture sheet.

Once the pieces of ferrous metal 18 have been cleaned from the underside of capture sheet 22, the winch 24 may be reversed so as to lower the permanent magnet housing 12 back down on to capture sheet 22 so as to allow continued removal or cleaning of the pieces of ferrous metal 18 from the flow of material 16 on the conveyer belt 14 passing underneath.

Figure 5:
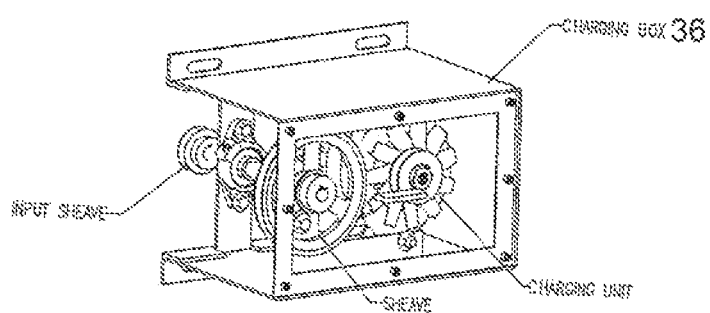
FIG. 5 is, in perspective view, one embodiment of the alternator driving mechanism having the power take off from the idler or pulley.

One example of the charging system is seen in FIG. 5 wherein the charging box sheave and the input sheave are mounted on a common axle supported on a frame, and wherein the charging box sheave is aligned with an alternator sheave mounted to the drive shaft of an alternator.

In one preferred embodiment not intended to be limited, the electric actuator is a 4000 pound class electric winch. The winch line may be a non-metallic synthetic fibre cable.

In further embodiments, not intended to be limiting, the permanent magnet housing 12 may be raised into its raised positioned without necessarily being pivoted or without being winched. For example, housing 12 may be elevated vertically in a horizontal orientation so as to be spaced above capture sheet 22 by the operation of other kinds of actuators such as one or more air bags. Again, a winch or other actuator may be, for example, electrically driven, (for the airbag example, the compressor would be electrically driven) so that housing 12 may for example translate up and down on vertical rails or may be pivoted. In all of those embodiments again, the system is self-contained in the sense that energy is taken parasitically, from the movement of the conveyer or otherwise, or in addition to, harvested or scavenged so that the actuator is powered without the need of an external power source.

The invention claimed is:

1. A magnet cleaner cooperating with a conveyer carrying pieces of metal in non-ferrous material, the magnet cleaner comprising:
a frame, at least one permanent magnet positionably mounted on the frame so as to be selectively elevatable between a lowered position and a raised position upon actuation of an actuator, wherein the actuator is positioned so as to cooperate with the permanent magnet and the frame,
a capture sheet mounted to the frame and positioned on the frame so as to be substantially flush with the at least one permanent magnet when in the lowered position, and spaced by an attenuation distance from the at least one permanent magnet when in the raised position,
a passive energy source cooperating with the actuator so as to selectively drive the actuator to thereby position the at least one permanent magnet between the lowered and raised positions, and wherein the energy source charges a battery and the actuator is electrically driven by the battery,
whereby, when the at least one permanent magnet is in the raised position the attenuation distance to the capture sheet is sufficient to allow release of ferrous metals collected to an underside of the capture sheet; captured from material on the conveyer belt when the at least one permanent magnet is in the lowered position,
wherein a rotatable member is positioned under the capture sheet so as to engage the conveyer and to cause an upwardly extending bump in the conveyer wherein the bump is thus statically positioned under the capture sheet as the conveyor conveys the non-ferrous material in a longitudinally extending downstream direction relative to the frame.

2. The magnet cleaner of claim 1 wherein the energy source includes a solar panel.

3. The magnet cleaner of claim 1 wherein the rotatable member is elongate and positioned to engage an underside of the conveyer, and so as to extend across a lateral width of the conveyer.

4. The magnet cleaner of claim 3 wherein the rotatable member extends completely across the width of the conveyer.

5. A magnet cleaner cooperating with a conveyer carrying pieces of metal in non-ferrous material, the magnet cleaner comprising:
a frame, at least one permanent magnet positionably mounted on the frame so as to be selectively elevatable between a lowered position and a raised position upon actuation of an actuator, wherein the actuator is positioned so as to cooperate with the permanent magnet and the frame,
a capture sheet mounted to the frame and positioned on the frame so as to be substantially flush with the at least one permanent magnet when in the lowered position, and spaced by an attenuation distance from the at least one permanent magnet when in the raised position,
a passive energy source cooperating with the actuator so as to selectively drive the actuator to thereby position the at least one permanent magnet between the lowered and raised positions, and wherein the energy source charges a battery and the actuator is electrically driven by the battery,
whereby, when the at least one permanent magnet is in the raised position the attenuation distance to the capture sheet is sufficient to allow release of ferrous metals collected to an underside of the capture sheet; captured from material on the conveyer belt when the at least one permanent magnet is in the lowered position,
wherein the actuator includes a winch and a corresponding winch line, wherein the winch is mounted on the frame and the winch line is positioned to haul the housing upwardly upon actuation of the winch.

6. The magnet cleaner of claim 5 wherein the winch is an electric winch.

7. A magnet cleaner cooperating with a conveyer carrying pieces of metal in non-ferrous material, the magnet cleaner comprising:
a frame, at least one permanent magnet positionably mounted on the frame so as to be selectively elevatable between a lowered position and a raised position upon actuation of an actuator, wherein the actuator is positioned so as to cooperate with the permanent magnet and the frame,
a capture sheet mounted to the frame and positioned on the frame so as to be substantially flush with the at least one permanent magnet when in the lowered position, and spaced by an attenuation distance from the at least one permanent magnet when in the raised position,
a passive energy source cooperating with the actuator so as to selectively drive the actuator to thereby position the at least one permanent magnet between the lowered and raised positions, and wherein the energy source charges a battery and the actuator is electrically driven by the battery, whereby, when the at least one permanent magnet is in the raised position the attenuation distance to the capture sheet is sufficient to allow release of ferrous metals collected to an underside of the capture sheet: captured from material on the conveyer belt when the at least one permanent magnet is in the lowered position, wherein the at least one permanent magnet is pivotably mounted to the frame.

8. The magnet cleaner of claim 5 wherein the at least one permanent magnet is pivotally mounted to the frame.

9. The magnet cleaner of claim 7 wherein the at least one permanent magnet is a plurality of magnets, and further comprises a housing wherein the plurality of magnets are mounted.

10. A magnet cleaner cooperating with a conveyer carrying pieces of metal in non-ferrous material, the magnet cleaner comprising:
a frame, at least one permanent magnet positionably mounted on the frame so as to be selectively elevatable between a lowered position and a raised position upon actuation of an actuator, wherein the actuator is positioned so as to cooperate with the permanent magnet and the frame,
a capture sheet mounted to the frame and positioned on the frame so as to be substantially flush with the at least one permanent magnet when in the lowered position, and spaced by an attenuation distance from the at least one permanent magnet when in the raised position,
a passive energy source cooperating with the actuator so as to selectively drive the actuator to thereby position the at least one permanent magnet between the lowered and raised positions, and wherein the energy source charges a battery and the actuator is electrically driven by the battery,
whereby, when the at least one permanent magnet is in the raised position the attenuation distance to the capture sheet is sufficient to allow release of ferrous metals collected to an underside of the capture sheet: captured from material on the conveyer belt when the at least one permanent magnet is in the lowered position, wherein the energy source includes a solar panel,
further comprising a parasitic energy scavenger mounted so as to engage the conveyer, wherein translation of the conveyer imparts energy from the conveyer to the energy scavenger.

11. The magnet cleaner of claim 10 wherein the energy scavenger includes a rotatable member adapted to rotatably engage with the conveyer so as to convert translational energy of the conveyer to rotational energy of the rotatable member.

12. The magnet cleaner of claim 11 wherein the conveyer has a top-side and an under-side, and wherein the rotatable member contacts the underside of the conveyer.

13. The magnet of cleaner claim 12 wherein the rotatable member includes a roller mounted under the underside of the conveyer, and wherein the roller engages the underside of the conveyer so as to cause an upwardly extending bump in the conveyer at a static position under the capture sheet.

14. The magnet cleaner of claim 13 wherein the conveyer translates in a longitudinal direction along its length, and wherein the roller extends transversely relative to the longitudinal direction of the conveyer.

15. The magnet cleaner of claim 14 wherein the roller extends entirely across a transverse width of the conveyer.

16. The magnet cleaner of claim 15 wherein the energy scavenger includes an idler engaging an underside of the conveyer and wherein the energy scavenger includes a power take-off cooperating with the idler and wherein the energy converter includes a rechargeable battery so that the energy of the translation of the conveyer belt is converted into an electrical charge of the battery, and wherein the actuator is an electrically powered actuator mounted to the frame and to the at least one permanent magnet, wherein the actuator is selectively actuatable so as to selectively raise and lower the at least one permanent magnet between the raised and lowered positions.

17. The magnet cleaner of claim 16 wherein the idler is positioned to cause a bump in the conveyer as the conveyer translates over the idler.

\* \* \* \* \*